(No Model.)
M. LAPERSONNERIE.
FIRE PROOF PARTITION BLOCK.
No. 287,552. Patented Oct. 30, 1883.
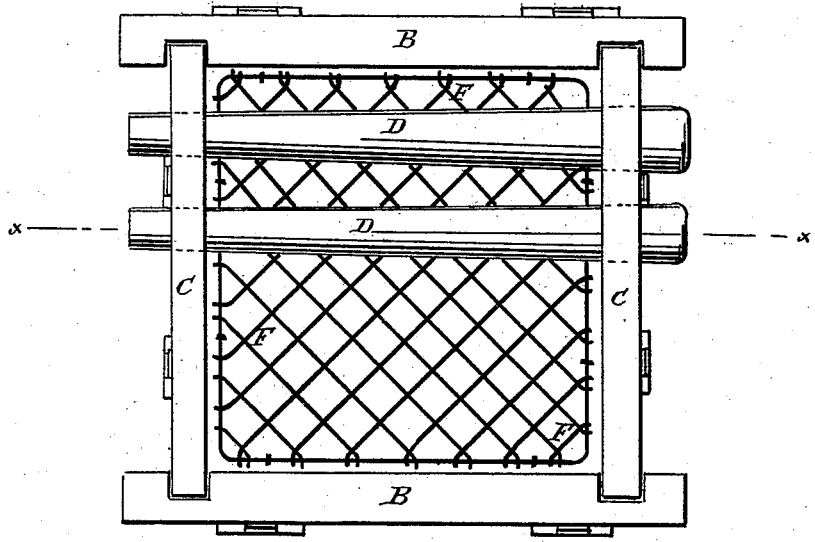
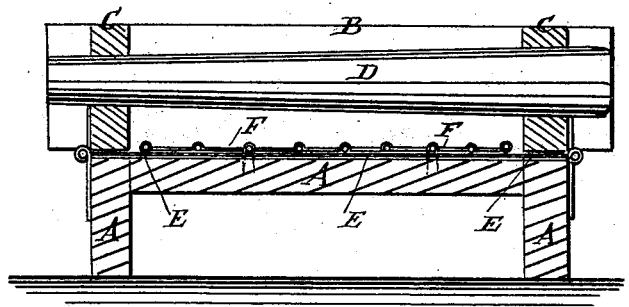
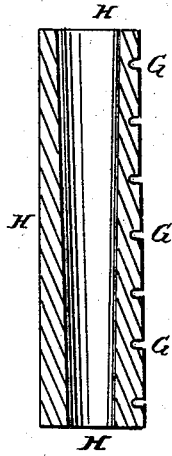
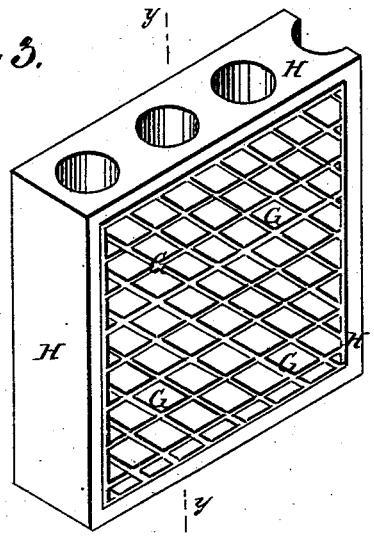
WITNESSES:
Chas. Nida
C. Sedgwick
INVENTOR:
M. Lapersonnerie
BY Munn & Co.
ATTORNEYS.

UNITED STATES PATENT OFFICE.

MARTIAL LAPERSONNERIE, OF NEW YORK, N. Y.

FIRE-PROOF PARTITION-BLOCK.

SPECIFICATION forming part of Letters Patent No. 287,552, dated October 30, 1883.

Application filed September 4, 1883. (No model.)

*To all whom it may concern:*

Be it known that I, MARTIAL LAPERSONNERIE, of the city, county, and State of New York, have invented a new and useful Improvement in Fire-Proof Partition-Blocks, of which the following is a full, clear, and exact description.

Reference is to be had to the accompanying drawings, forming part of this specification, in which similar letters of reference indicate corresponding parts in all the figures.

Figure 1 is a plan view of a mold for forming my improved fire-proof partition-blocks, some of the rolls being removed. Fig. 2 is a sectional elevation of the same, taken through the line $x$ $x$, Fig. 1. Fig. 3 is a perspective view of one of the blocks; and Fig. 4 is a sectional elevation of the same, taken on the line $y$ $y$, Fig. 3.

The object of this invention is to facilitate the manufacture of fire-proof partition-blocks.

The invention consists in a mold having a wire or cord netting applied to its base by means of a piece of canvas, to form depressions in the surface of the partition-blocks molded thereon, so that the mortar or plastering applied to the partition formed of said blocks will adhere firmly thereto, as will be hereinafter fully described.

A represents the base of a mold for forming fire-proof partition-blocks. B are the sides, and C are the ends, of the mold, which are hinged to the base A in the ordinary manner. The ends C are perforated in the usual manner to receive the rolls D, for forming the apertures through the blocks.

E is a piece of canvas of such a size and shape as to cover the base A, so that its edges will be clamped to the said base by the lower edges of the sides B and ends C when the said sides and ends are turned up into a vertical position, as shown in Fig. 2.

To the canvas E is secured a netting, F, of wire, cords, or other suitable material, of such a size of strand and mesh as will leave suitable depressions, G, in the side of the molded block H to cause the mortar or plastering to adhere firmly to the said block. The blocks H can be made of any suitable material, and are molded in the ordinary manner.

By my improvement the labor of scratching or otherwise roughening the surface of the molded blocks while the material is still soft will be avoided. When the blocks H are molded, the rolls D are withdrawn, the sides and ends B C are turned down, and the block is lifted off the base A, with the netting F and canvas E adhering to it, which netting and canvas are then removed by taking hold of the projecting edges of the said canvas.

Having thus described my invention, I claim as new and desire to secure by Letters Patent—

1. The combination, with the mold A B C of the canvas E and netting F, substantially as herein shown and described, whereby depressions will be formed in the side of the molded block, to cause the mortar to adhere firmly thereto, as set forth.

2. The mode of forming depressions in the side of fire-proof partition-blocks, substantially as herein shown and described, which consists in applying a wire or cord netting to the base of the molds, as set forth.

3. Fire-proof partition-blocks H, made, substantially as herein shown and described, with depressions G molded in their sides, to give a firm support to the plastering, as set forth.

MARTIAL LAPERSONNERIE.

Witnesses:
 JAMES T. GRAHAM,
 C. SEDGWICK.